US008229771B1

(12) United States Patent
Billman

(10) Patent No.: US 8,229,771 B1
(45) Date of Patent: Jul. 24, 2012

(54) SYSTEMS AND METHODS FOR INSURING STORED FOOD

(75) Inventor: Bradly J. Billman, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 13/306,703

(22) Filed: Nov. 29, 2011

Related U.S. Application Data

(63) Continuation of application No. 12/479,188, filed on Jun. 5, 2009, now Pat. No. 8,069,068.

(51) Int. Cl.
  *G06Q 40/00* (2006.01)
  *G06Q 10/00* (2006.01)
  *B29D 22/00* (2006.01)
  *G07F 11/00* (2006.01)
  *A21D 6/00* (2006.01)
  *G01N 33/48* (2006.01)

(52) U.S. Cl. ........... 705/4; 702/19; 705/7.41; 705/37; 221/84; 235/379; 156/213; 426/248

(58) Field of Classification Search ............ 702/19; 705/4, 37, 7.41; 221/84; 235/379; 156/213; 426/248
See application file for complete search history.

(56) References Cited

U.S. PATENT DOCUMENTS

| | | | |
|---|---|---|---|
| 3,608,775 A * | 9/1971 | Offutt | 221/84 |
| 4,831,526 A | 5/1989 | Luchs et al. | |
| 4,975,840 A * | 12/1990 | DeTore et al. | 705/4 |
| 5,870,711 A | 2/1999 | Huffman | |
| 6,204,763 B1 * | 3/2001 | Sone | 340/568.1 |
| 6,219,653 B1 | 4/2001 | O'Neill et al. | |
| 6,334,192 B1 * | 12/2001 | Karpf | 714/1 |
| 6,573,831 B2 | 6/2003 | Ikeda et al. | |
| 7,455,225 B1 | 11/2008 | Hadfield et al. | |
| 7,587,353 B2 | 9/2009 | Melchior et al. | |
| 2001/0034681 A1 | 10/2001 | Abbott et al. | |
| 2002/0099655 A1 | 7/2002 | Melchior et al. | |
| 2002/0107785 A1 | 8/2002 | Melchior et al. | |

(Continued)

FOREIGN PATENT DOCUMENTS

JP  2006004331  1/2006

OTHER PUBLICATIONS

Linda Scott Kantor et al, Estimating and Addressing American's Food Losses, Food Review, vol. 20 No. 1 Jan.-Apr. 1997, Economic Research Service, USDA (LSKantor).*

(Continued)

*Primary Examiner* — Chika Ojiaku
(74) *Attorney, Agent, or Firm* — Brooks, Cameron & Huebsch, PLLC

(57) ABSTRACT

A person may store food to prepare for an emergency. An insurance policy may be issue to cover the stored food against loss, theft, spoilage, etc. In issuing the insurance policy and setting the premium, the insurer may take various factors into account, such as the type of food to be stored (e.g., canned, dried, etc.), where the food is to be stored (e.g., a cellar, a closet, a food locker, etc.), and whether the stored food is rotated with new food to prevent the stored food from spoiling due to age. During the life of the insurance policy, the insurer may issue alerts to the policyholder in order to advise the policyholder to rotate old food out of storage.

18 Claims, 4 Drawing Sheets

U.S. PATENT DOCUMENTS

| | | | |
|---|---|---|---|
| 2002/0120776 A1 | 8/2002 | Eggebraaten et al. | |
| 2002/0156656 A1 | 10/2002 | Harrell et al. | |
| 2004/0230460 A1 | 11/2004 | Thomas et al. | |
| 2005/0261991 A1* | 11/2005 | Kennamer | 705/28 |
| 2006/0091230 A1 | 5/2006 | Kallestad | |
| 2006/0253351 A1* | 11/2006 | Keaney | 705/35 |
| 2007/0011033 A1 | 1/2007 | Atkinson et al. | |
| 2007/0174130 A1 | 7/2007 | Seeley | |
| 2007/0226029 A1 | 9/2007 | Gross et al. | |
| 2009/0024420 A1 | 1/2009 | Winkler | |

OTHER PUBLICATIONS

Alan T. Hagan, Prudent Food Storage: Questions and Answers, From the House at Cat's Green, pp. 1-9, Ver. 3.5 Updated Nov. 1999 supersedes Ver. 3.0 (AHagan).*

Alan T. Hagan, Prudent Food Storage: Questions and Answers, From the House at Cat's Green, pp. 6-7, Version 3.00 Updated Sep. 1998 (FoodIns).

Daugherty, Donna: "Business Bytes: Insurance Coverage for the Food Processor", Spring 99, vol. 2, No. 1, 4 pages.

Institute of Frozen Food Clause (A), Jan. 1, 1986 (FrozenFoods).

Linda Scott Kantor et all, Estimating and Addressing America's Food Losses, FoodReview, vol. 20 No. 1 Jan.-Apr. 1997, Economic Research Service/USDA, (Kantor).

Roy McCormick, Inventory Spoilage from Power Failure, Jun. 2001, BNET—Rough Notes (Inventory).

Steve Dwyer, Auto Alerts Prods Policyholders, Apr. 2003 (AutoAlert).

Toshiyuki, JP 2006004331—Google Transalation of Japanese Patent, Premium Calculation System, Daikin Industries, Ltd (JPPGPub).

* cited by examiner

SYSTEMS AND METHODS FOR INSURING STORED FOOD

CROSS-REFERENCE TO RELATED APPLICATIONS

This application is a continuation of U.S. patent application Ser. No. 12/479,188, filed on Jun. 5, 2009, now U.S. Pat. No. 8,069,068, which is herein incorporated by reference.

BACKGROUND

Many people store food, so that the food can be used for emergencies. Examples of emergencies include natural disaster, war, job loss, or any other situation that might make food difficult to obtain. Storing food may make a person feel more secure, knowing that he or she will not go hungry in the event that an emergency makes food unavailable. While food storage provides this measure of security, it also creates a risk: The food could spoil, or could be damaged, or could be stolen, thereby causing the person who stored the food to lose the money invested in the food. This risk may cause people to avoid storing food.

SUMMARY

Food storage insurance may be provided in order to mitigate the risk that money invested in stored food will be lost. The insurance may cover food in the event of loss, damage, spoilage, or any other event. The insurance coverage may be subject to various conditions. For example, insurance coverage might be limited to non-perishable items. As another example, coverage might be made conditional on rotating stores of food, storing the food in a temperature-controlled area, or on any other conditions.

This summary section is provided to introduce a selection of concepts in a simplified form that are further described below in the detailed description section. This summary section is not intended to identify key features or essential features of the claimed subject matter, nor is it intended to be used to limit the scope of the claimed subject matter.

DETAILED DESCRIPTION

Many people store food to prepare for emergencies. Examples of emergencies include natural disasters such as hurricanes or snowstorms, war, terrorist attacks, loss of income, or any other circumstance that makes food unavailable or difficult to obtain. People may store the food in various places, such as cellars, closets, food lockers, or even at random locations throughout their houses.

While stored food provides a measure of security in the event of emergency, one issue that arises is that the stored food represents stored wealth, and the stored wealth can be lost if the food spoils or is stolen. Many people choose to store their emergency supplies of wealth in a bank account since, in the United States, bank accounts are insured by a federal agency at no additional expense to the depositor. Wealth stored in the form of a bank account does not provide the same type of security as having stored food. People expect to eat on a regular basis, and it is conceivable that, during times of emergency, food might not be available at any price, or only at an exorbitant price. But since the circumstances in which food is unavailable are rare, people often choose to forego the security of having stored food in order to avoid the risk that the stored food will spoil or will be stolen, thereby depriving the owner of its value.

The subject matter herein may be used to insure stored food. An insurance policy may be issued on a cache of stored food. The insurance policy may insure the food like other policies that cover valuable chattels, but may also take into account issues that are particular to food. For example, food is subject to spoilage, while most chattels are not. The risk of spoilage may differ depending on the nature of the food (e.g., refrigerated or frozen food is subject to different spoilage risks than canned food). Food may have an expiration date, or may otherwise tend to go bad as it ages. Moreover, since food is intended to be consumed, there may be a particularly high risk of claim fraud, since it is difficult to verify whether an insured item for which a claim has been issued was stolen or if it was merely consumed. The mechanics of a food insurance policy may take into account these issues, as well as others.

Figure 1:
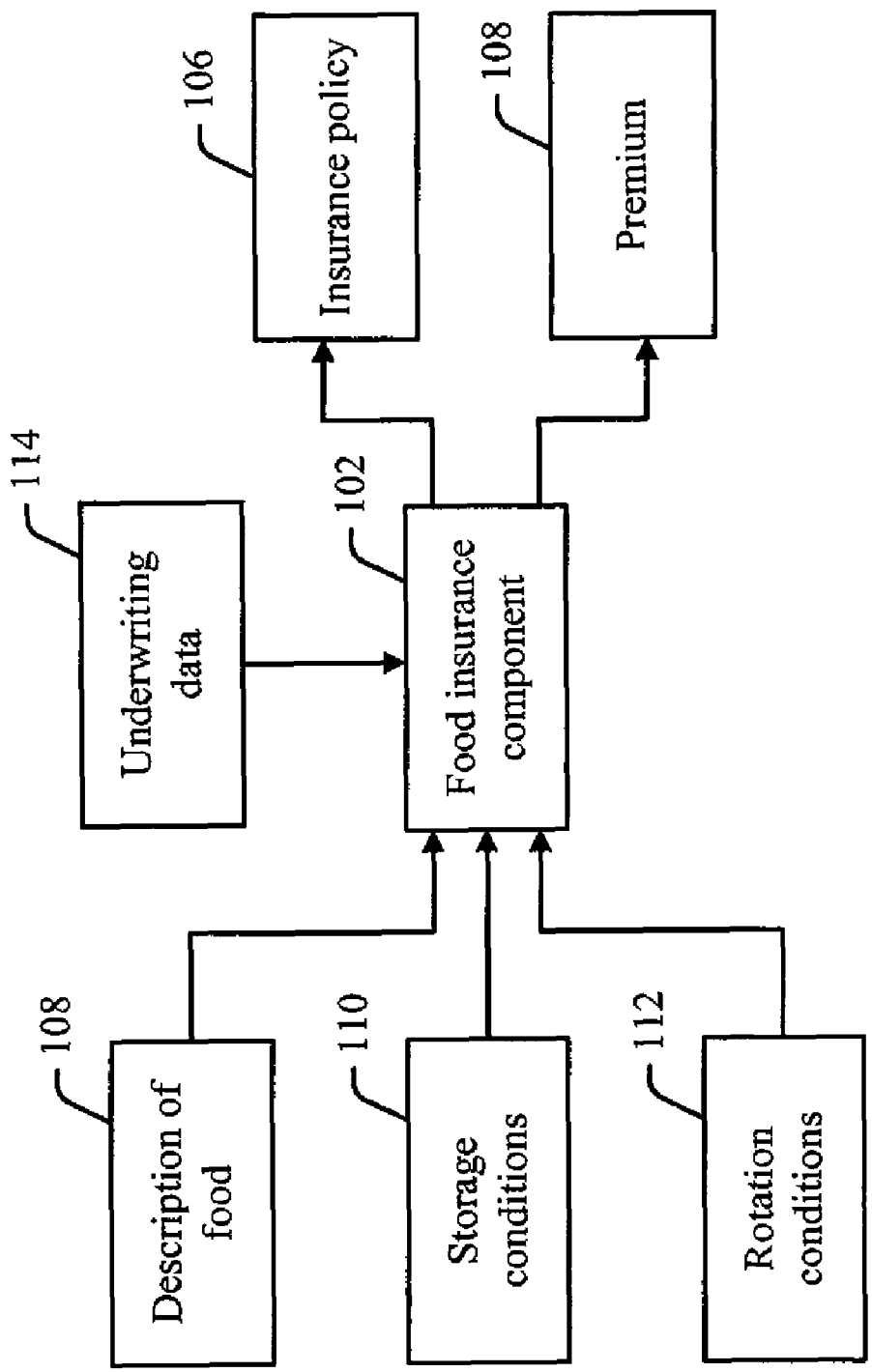
FIG. 1 is a block diagram of an example system that may be used to issue insurance on food.

Turning now to the drawings, FIG. 1 shows an example system that may be used to issue insurance on food. Food insurance component 102 may be used to issue an insurance policy 104 based on various factors. Food insurance component 102 may be implemented, for example, as software or as part of a computer system, although food insurance component could be implemented in any manner.

Food insurance component 102 may take various factors into account in determining whether to issue insurance policy 104, and in determining what the premium 106 for such policy is. Some examples of these factors are shown in FIG. 1. One example factor is a description 108 of the food to be insured. For example, the food that a customer proposes to insure may be canned food (e.g., canned fruits, vegetables, meats, fish, etc.); dry goods (e.g., grain, flour, seeds, etc.); jarred food (e.g., peanut butter, nuts, etc.); dried or cured food (e.g., beef jerky, raisins or other dried fruits, etc.); or any other type of food. These different types of food may be associated with different risks. For example, canned food may have a shelf life of five years, while dried food may have a shelf life of ten years. On the other hand, dried food may be subject to damage from vermin, while canned food might not be. There may be specific risk issues associated with specific foods. For example, canned fish may have a shorter shelf life than canned tomatoes. Some foods (e.g., fresh or frozen foods that rely on refrigeration to prevent spoilage) may be of a particularly high risk, and thus might be uninsurable (although whether a particular type of food is insurable depends on the specific underwriting standards being applied, so such foods might be insurable under a particular set of underwriting standards). These are some examples of types of food, and of how different risks may be associated with different types of food, although the subject matter herein may apply to any type of food, which could be associated with any type of risk.

Another example factor that food insurance component 102 may take into account is storage conditions 110. Food may be stored in a variety of conditions. For example, some people may store food in cellar, a food locker, or some other location where temperature and humidity are considered to be relatively stable. On the other hand, some people may store food around their house—e.g., behind furniture, in bedroom closets, or anyplace else where there is space to store the food. Storage conditions 110 may affect the risk of storing food. For example, in a cellar or a climate-controlled food locker, where the temperature and humidity may be relatively stable and at non-extreme levels, certain types of spoilage are relatively unlikely to occur. At cellar temperatures, bacteria tend to grow slowly. In a low humidity environment, mould damage is less likely than in a high humidity environment. Moreover, without large swings in temperature, the seals on cans are less likely to become damaged. Therefore, the risk associated with storing food may be relatively low when the food is stored in a climate-controlled food locker or in a cellar. On the other hand, storing food in a house might subject the food to large seasonal changes in temperature or humidity. While a modern house is relatively climate-controlled through air conditioning and central heating, there are times when the temperature and humidity in the house change significantly—e.g., when the occupants are on vacation and they turn off the heat or air conditioning to reduce energy costs. Moreover, food that is stored around the house may be relatively more likely to be stolen. The food in the house may even be eaten inadvertently, thereby increasing somewhat the risk of a false claim for loss or theft of the food. Thus, food that is stored in a house may be somewhat riskier to insure than food that is stored in a food locker or a cellar.

Another example factor that food insurance component 102 may take into account is rotation conditions 112. Food stores may be acquired overtime, which results in some instances of the stored food being older than other stored instances. For example, if a person buys an extra jar of peanut butter every month in order to invest in stored food, by the end of the year the person will have twelve jars of peanut butter of varying ages. Moreover, the same person may also buy some peanut butter to eat rather than to store. Unless the stored food is used (e.g., due to an emergency), this scenario results in the person routinely eating the newest jar of peanut butter, while also having many increasingly old jars of peanut butter that are at risk for spoilage as they age. If the person has a system for rotating food, so that new food is put into storage and old food is eaten, this system may reduce the risk of spoilage. For example, each time the person buys a jar of peanut butter, he could put that jar into storage and then take an older jar out of storage to eat. This procedure is an example of a food rotation system. The existence of such a system may reduce the risk of insuring food against spoilage, and thus may affect the insurability of food and/or the price of the insurance.

Factors 108-112 are examples of factors that may be taken into account by food insurance component in issuing insurance policy 104, although any other factors could be taken into account.

Food insurance component 102 may use underwriting data 114 to determine whether to issue insurance policy 104, and at what premium 106. Underwriting data 114 may include a historical record of the risks associated with insuring food under certain conditions. For example, underwriting data 114 may show that a certain level of risk is associated with canned food, and that a different level of risk is associated with dried food. Underwriting data 114 may also show the historical levels of risk associated with particular storage conditions 110, particular rotation conditions 112, or risks associated with any other factors. Thus based on underwriting data 114, and/or based on the particular factors associated with the food to be insured, food insurance component 102 may determine whether to issue insurance policy 104, and what the premium 106 of that policy is to be.

Figure 2:
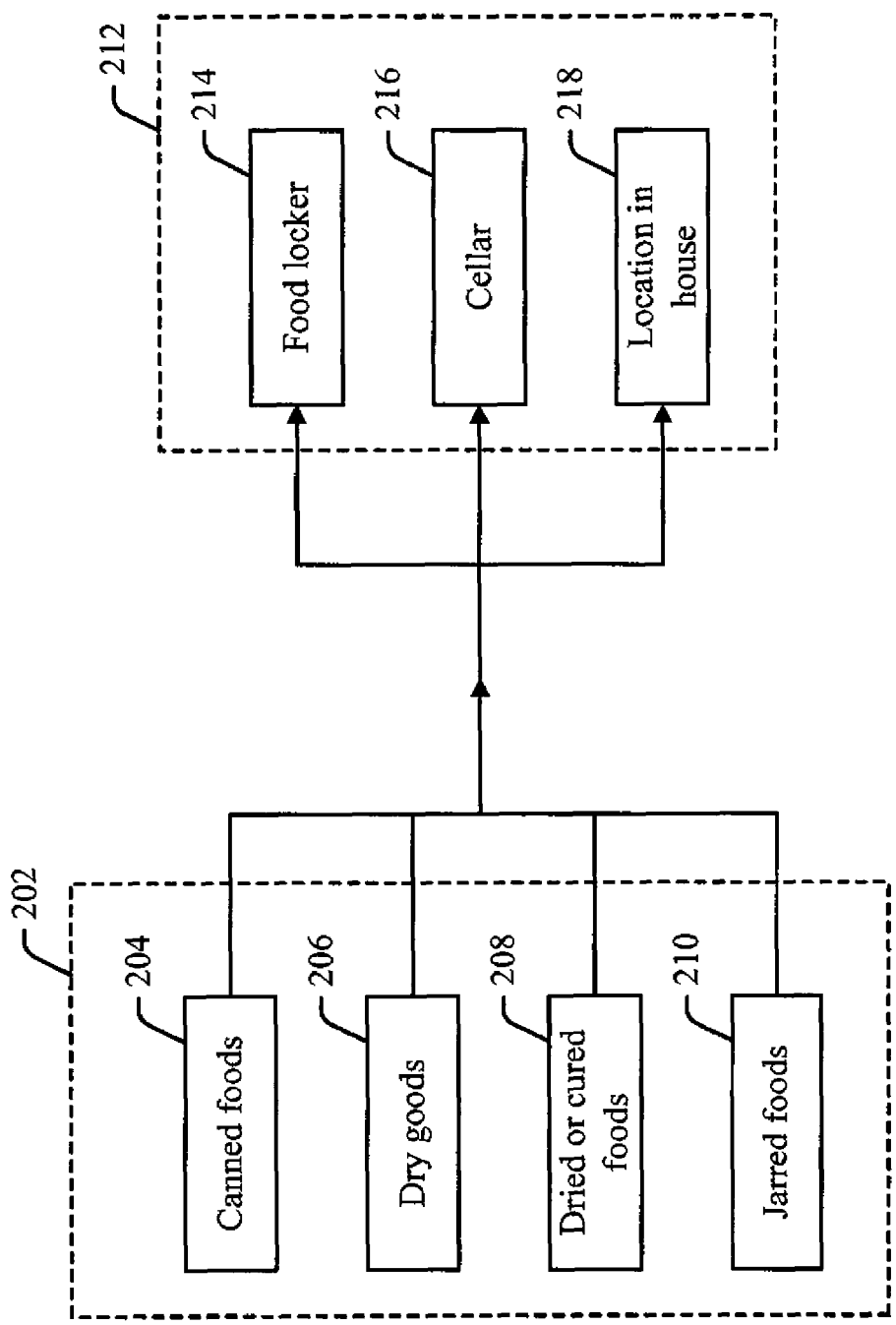
FIG. 2 is a block diagram of example types of food, and example places in which food could be stored.

FIG. 2 shows examples of types of food, and of places in which food could be stored.

In the example of FIG. 2, types of food 202 include canned food 204, dry goods 206, dried or cured foods 208, and jarred foods 210. The types of food 202 shown in FIG. 2 are merely examples, and it is noted that the subject matter described herein applies to any types of food.

There are various examples of places 212 in which food could be stored. One such example is a food locker 214, which may be a secured, climate-controlled area in which food may be stored in relatively stable conditions. Another example of a place in which food may be stored is a cellar 216. Yet another example is locations in a house, such as closets, behind furniture, spare rooms, or any other such places.

As previously described, there may be various risks associated with particular types of food and/or particular ways of storing that food. For example, food in a cellar or climate-controlled food locker may be less likely to spoil than food stored in closets or in ordinary rooms of a house. Food stored in a food locker may be less likely to be stolen than food stored in other areas.

In addition to the food types and storage locations shown in FIG. 2, other types of food and/or storage locations may be used. For example, another type of food is frozen food, and an example of a place in which such frozen food could be stored is a freezer. There may be particular considerations that apply to the insurance of frozen food. For example, frozen food is particularly likely to spoil if it is stored in a freezer that depends on electricity.

Figure 3:
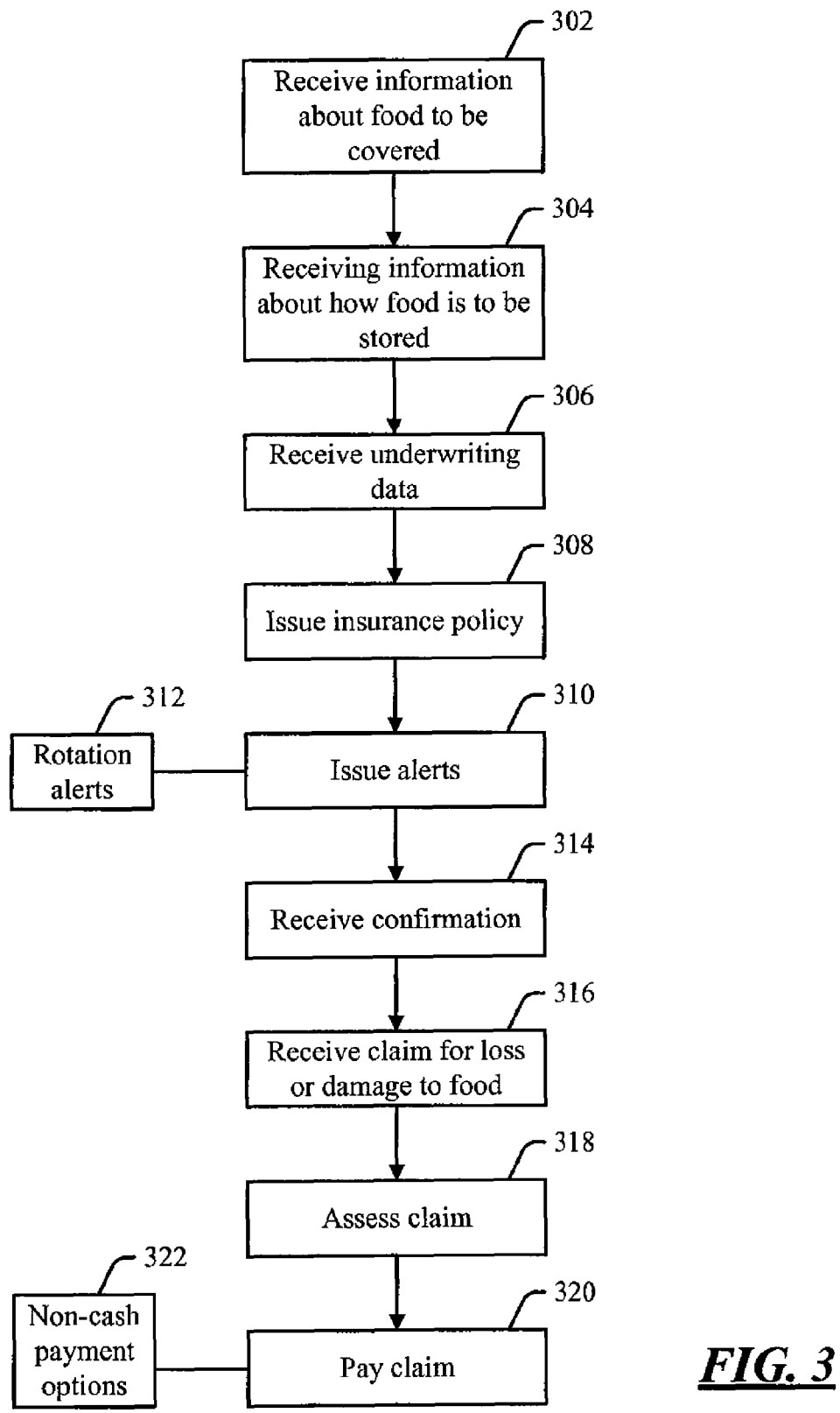
FIG. 3 is a flow diagram of an example process in which an insurance policy on food may be issued and/or administered.

FIG. 3 shows an example process in which an insurance policy on food may be issued and/or administered. Before turning to a description of FIG. 3, it is noted that the flow diagram shown in FIG. 3 is described, by way of example, with reference to components shown in FIGS. 1 and 2, although these processes may be carried out in any system and are not limited to the scenarios shown in FIGS. 1 and 2. Additionally, the flow diagram of FIG. 3 shows an example in which stages of a process are carried out in a particular order, as indicated by the lines connecting the blocks, but the various stages shown in FIG. 3 may be performed in any order, or in any combination or sub-combination.

At 302, information is received about the food to be insured. For example, the nature of the food (e.g., canned fruit, dried meat, etc.) may be received at 302.

At 304, information is received about how the insured food is to be stored. For example, the information received at 304 may indicate whether the owner of the food intends to keep the food in a food locker, a freezer, a cellar, a closet of his home, etc.

At 306, underwriting data is received. The underwriting data may, for example, indicate historical loss experience associated with certain types of food and/or certain storage arrangements.

At 308, an insurance policy may be issued based on the information received at 302-306.

Following issuance of the insurance policy, the policy may be serviced in various ways. One example way in which the policy may be serviced is to issue alerts to the owner of the food (at 310). One example of an alert is a rotation alert (at 312). As previously described, there may be reason to rotate stores of food by consuming old stored food and replacing the stored food with new food. The insurer may want to issue alerts to remind the owner of the food to make sure a rotation. If the insurer issues an alert to remind the insured party to rotate stores of food, the insurer may receive, from the insured party, a confirmation that the food has been rotated (at 314).

(E.g., the insured party may be called upon to certify periodically that he or she has rotated stores of food. The certification, when provided by the insured party, is an example of the kind of confirmation that may be provided at 314.)

At some point during the life of an insurance policy, a claim for loss or damage to insured food may be received (at 316). When such a claim is received, the claim may be assessed (at 318). The assessment process may determine whether the loss or damage is a covered risk under the policy. If the loss or damage is a covered risk, then the insurer may pay a claim for the loss or damage of food (at 320). Although the claim may be paid in any manner (e.g., by check), in one example the insurer may want to pay the claim in the form of certificates or cards whose use is limited to replacing the food item for which the claim is made. There is a danger that the holder of a food insurance policy might use the policy to convert food to money, but settling a claim in the form of a certificate or card that can only be used to buy food (or to buy the specific food item for which the claim is made) reduces the risk that an insured would file a fraudulent claim in order to convert stored food into money.

Figure 4:
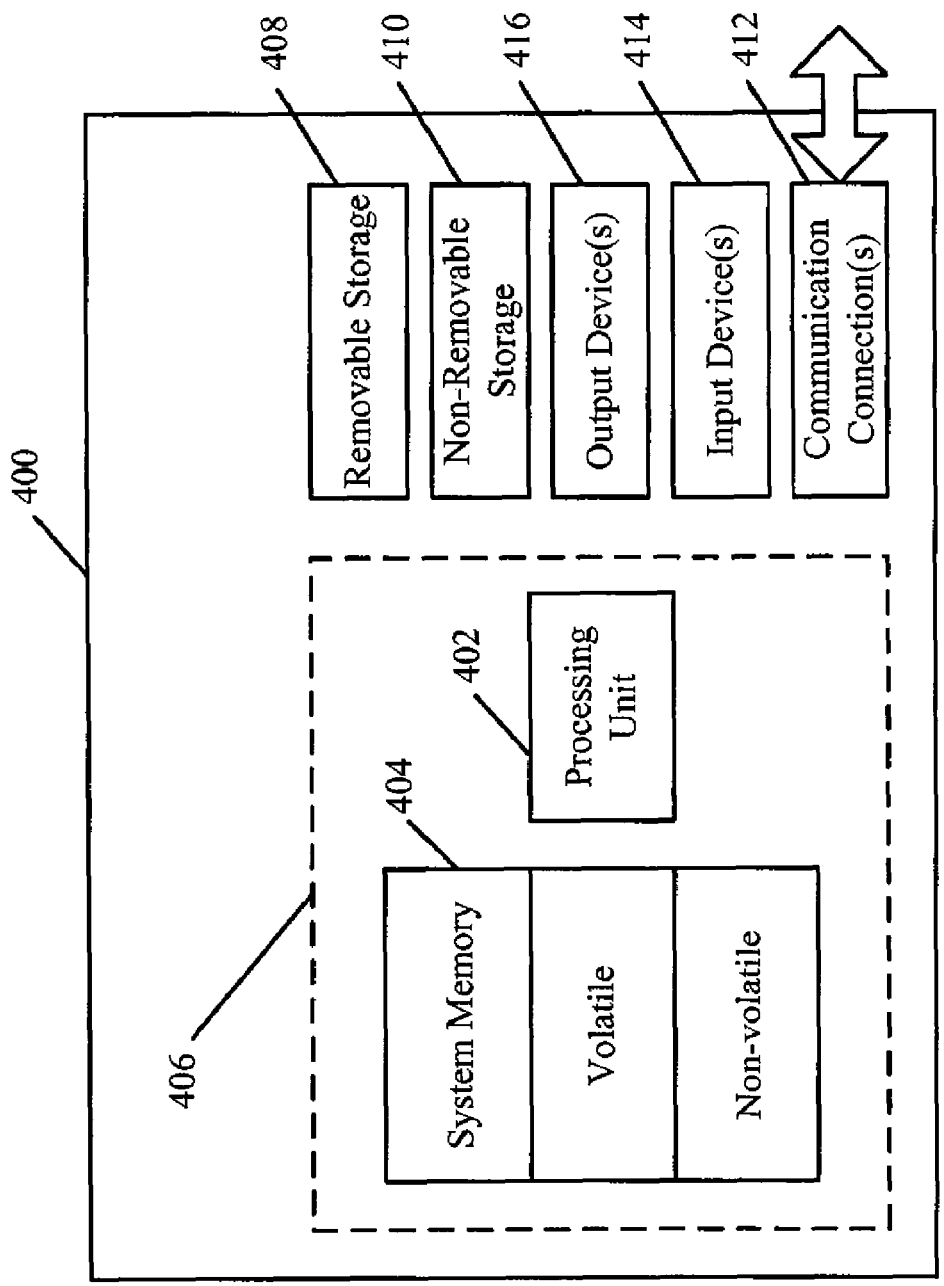
FIG. 4 is a block diagram of an example computing environment that may be used in connection with implementations of the subject matter described herein.

The subject matter described herein may be implemented through the use of a computer system, or other type of device that has some computing mechanism(s). FIG. 4 shows an example computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, personal computers (PCs), server computers, handheld or laptop devices, multiprocessor systems, microprocessor-based systems, network PCs, minicomputers, mainframe computers, embedded systems, distributed computing environments that include any of the previously-described systems or devices, and the like.

Computer-executable instructions, such as program modules, being executed by a computer may be used. Generally, program modules include routines, programs, objects, components, data structures, etc., that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 4, an example system for implementing aspects described herein includes a computing device, such as computing device 400. In its most basic configuration, computing device 400 typically includes at least one processing unit 402 and memory 404. Depending on the exact configuration and type of computing device, memory 404 may be volatile (such as random access memory (RAM)), non-volatile (such as read-only memory (ROM), flash memory, etc.), or some combination of the two. This most basic configuration is illustrated in FIG. 4 by dashed line 406.

Computing device 400 may have additional features/functionality. For example, computing device 400 may include additional storage (removable and/or non-removable) including, but not limited to, magnetic or optical disks or tape. Such additional storage is illustrated in FIG. 4 by removable storage 408 and non-removable storage 410.

Computing device 400 typically includes a variety of computer readable media. Computer readable media can be any available media that can be accessed by computing device 400 and includes both volatile and non-volatile media, removable and non-removable media. By way of example, and not limitation, computer readable media may comprise computer storage media and communication media.

Computer storage media includes volatile and non-volatile, removable and non-removable media implemented in any method or technology for storage of information such as computer readable instructions, data structures, program modules or other data. Memory 404, removable storage 408, and non-removable storage 410 are all examples of computer storage media. Computer storage media includes, but is not limited to, RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 400. Any such computer storage media may be part of computing device 400.

Computing device 400 may also contain communications connection(s) 412 that allow the device to communicate with other devices. Communications connection(s) 412 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. The term computer readable media as used herein includes both storage media and communication media.

Computing device 400 may also have input device(s) 414 such as keyboard, mouse, pen, voice input device, touch input device, etc. Output device(s) 416 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an API, reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

Although example embodiments may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system for issuing an insurance policy on food, the system comprising:
   at least one computing device with a processor and a memory having instructions stored therein that are executable by the processor to:
   determine a premium of a food insurance policy based on a type of food covered by the insurance policy, a condition in which the food is stored and rotated, and underwriting data that describes a loss experience associated with the type of food that identifies the way in which the food is stored and rotated;
   issue the food insurance policy
   issue an alert to a policyholder of the food insurance policy, wherein the alert advises the policyholder to rotate the food; and
   receive, from the policyholder, a confirmation that the supply of stored food has been rotated in response to receiving the alert that advises the policyholder to rotate the food.

2. The system of claim 1, wherein the underwriting data includes information that identifies risks associated with the way in which the food is stored and rotated.

3. The system of claim 1, wherein the information about how the food is stored indicates that the food is stored in a house of a person to whom the food insurance policy is issued.

4. The system of claim 1, wherein the food insurance policy requires rotation of old items of food by replacing the old items of food with new items of food.

5. The system of claim 1, wherein, in the event of a claim for loss or damage to an item of food that is covered by the food insurance policy, a card or certificate that is redeemable for a food item commensurate in value to the item of food that that was lost or damaged is issued.

6. A system for administering food insurance policy on a supply of stored food, the system comprising:
   at least one computing device with a processor and a memory having instructions stored therein that are executable by the processor to:
   issue food insurance policy based on a type of food to be stored and a condition in which the food is stored and rotated; and
   receive, from the policyholder, a confirmation that the supply of stored food has been rotated in response to receiving an alert advising the policyholder to rotate the food.

7. The system of claim 6, wherein an alert is issued to a policyholder of the food insurance policy, wherein the alert advises the policyholder to rotate the supply of stored food by replacing old food in the supply with Previously Presented food.

8. The system of claim 6, wherein the type of food is jarred or canned food.

9. The system of claim 6, wherein the confirmation comprises a certification by the policyholder that the supply of stored food has been rotated.

10. The system of claim 6, wherein, in the event of a claim for loss or damage to an item of food that is covered by the food insurance policy, a card or certificate that is redeemable for a food item commensurate in value to the item of food that that was lost or damaged is issued.

11. The system of claim 10, wherein the card or certificate is redeemable only for the type of food for which the claim was made.

12. A non-transitory computer-readable medium comprising computer-readable instructions stored thereon that are executed by a processor to:
   issue a food insurance policy based on a type of food to be covered by the insurance policy, a condition in which the food is stored and rotated, and underwriting data that describes a loss experience associated with the type of food that identifies the condition in which the food is stored and rotated;
   issue an alert to a policyholder of the food insurance policy, wherein the alert advises the policyholder to rotate the food; and
   receive, from the policyholder, a confirmation that the food has been rotated in response to receiving the alert that advises the policyholder to rotate the food.

13. The non-transitory computer-readable medium of claim 12, including instructions executed by the processor to, in the event of a claim for loss or damage to an item of food that is covered by the food insurance policy, issue a card or certificate that is redeemable for a food item commensurate in value to the item of food that that was lost or damaged.

14. The non-transitory computer-readable medium of claim 13, wherein the card or certificate is redeemable only for the type of food for which the claim was made.

15. The non-transitory computer-readable medium of claim 12, wherein the alert advising the policyholder to rotate the food includes instructions to rotate the food by replacing the food with Previously Presented food.

16. The non-transitory computer-readable medium of claim 12, wherein the confirmation comprises a certification by the policyholder that the supply of stored food has been rotated.

17. The non-transitory computer-readable medium of claim 12, wherein the underwriting data includes information that identifies risks associated with the way in which the food is stored and rotated.

18. The non-transitory computer-readable medium of claim 12, wherein the condition in which the food is stored comprises storing the food in a food locker or in a cellar.

* * * * *